United States Patent [19]

Hudson et al.

[11] Patent Number: 5,758,684
[45] Date of Patent: Jun. 2, 1998

[54] RETURN-TO-NORMAL MODULAR ACTUATOR

[75] Inventors: Hugh F. Hudson, Wauwatosa; James S. Greevers, West Allis; Dennis J. Ulicny, Waukesha, all of Wis.

[73] Assignee: Johnson Service Company, Milwaukee, Wis.

[21] Appl. No.: 683,737

[22] Filed: Jul. 17, 1996

Related U.S. Application Data

[63] Continuation-in-part of Ser. No. 388,722, Feb. 15, 1995, abandoned.

[51] Int. Cl.⁶ .................................................. F16K 31/53
[52] U.S. Cl. ........................................ 137/269; 251/129.03
[58] Field of Search ................... 251/129.03, 129.11, 251/248; 137/269

[56] References Cited

U.S. PATENT DOCUMENTS

| | | |
|---|---|---|
| 631,699 | 8/1899 | Darragh et al. ............................ 137/269 |
| 1,784,094 | 12/1930 | Fletcher . |
| 2,674,903 | 4/1954 | Doster . |
| 2,917,273 | 12/1959 | Best ................................... 137/269 X |
| 2,930,571 | 3/1960 | Vogl . |
| 4,090,589 | 5/1978 | Fitzwater . |
| 4,113,063 | 9/1978 | Troy . |
| 4,440,382 | 4/1984 | Pruvot et al. . |
| 4,533,114 | 8/1985 | Cory et al. . |
| 4,549,446 | 10/1985 | Beeson ........................... 251/129.03 X |
| 4,621,789 | 11/1986 | Fukamachi . |
| 4,741,508 | 5/1988 | Fukamachi . |
| 4,754,949 | 7/1988 | Fukamachi ......................... 251/129.03 |
| 4,881,420 | 11/1989 | Paul, Jr. . |
| 4,920,811 | 5/1990 | Hopper . |
| 4,951,915 | 8/1990 | Piao ................................. 251/129.03 X |
| 4,994,001 | 2/1991 | Wilkinson et al. ............. 251/129.03 X |
| 5,182,498 | 1/1993 | Stuhr . |
| 5,310,021 | 5/1994 | Hightower . |
| 5,518,462 | 5/1996 | Yach . |

*Primary Examiner*—Kevin Lee
*Attorney, Agent, or Firm*—Harness, Dickey & Pierce, P.L.C.

[57] ABSTRACT

An apparatus for selectively effecting actuation of one of a rotatably driven device and a linearly driven device. The apparatus includes a frame, an output gear cluster coupled to the frame for rotation relative thereto and driving means for selectively rotating the output gear cluster in a first direction and a second direction. The actuator further includes an output hub having at least one of a rotary output head adapted to couple the output gear cluster to the positioning member of the rotatably driven device and a linear output head adapted to couple the output gear cluster to the positioning member of the linearly driven device. By this arrangement, and by selectively coupling one of the rotary output head and linear output head to the output gear cluster and to the positioning member of one of the rotatably driven device and linearly driven device, the actuator selectively actuates one of the rotatably driven device and the linearly driven device.

20 Claims, 8 Drawing Sheets

_Fig-1_

_Fig-2_

_Fig-10_

_Fig-11_

RETURN-TO-NORMAL MODULAR ACTUATOR

CROSS-REFERENCE TO RELATED APPLICATION

This application is a continuation-in-part of U.S. patent application Ser. No. 08/388,722, filed Feb. 15, 1995, now abandoned.

BACKGROUND OF THE INVENTION

The invention relates generally to an actuator. In particular, the invention relates to an electromechanical actuator for actuating a valve or damper in a fluid distributing system, such as an air conditioning system or a heating system where the actuator must return the valve or damper to a "home" position when power is lost (return-to-normal). Conventional prior art return-to-normal actuators contain a return spring that is almost always coupled to the gear train that transmits power from a drive motor to the output which effects actuation. Because the spring in such a device is always in the gear train, a large drive motor and robust gears are required to supply appropriate torque to drive the load experienced because of the valve or damper being actuated, and also to supply torque to oppose the torque of the spring. As motor size increases, motor current draw also increases. Generally, motor cost also increases with motor size. Such increased current causes thermal problems for the actuator, for the drive electronics, and for the motor. Further, in such prior art devices where the spring is always coupled to the gear train, the spring is cycled every time the drive motor is cycled, thereby presenting significant fatigue problems for the spring. Typically, the life of such prior art return-to-normal actuators is limited by the fatigue life of the spring.

It would, therefore, be useful to have a return-to-normal actuator for use with valves, dampers, or other actuation environments which initially winds a spring or other bias device and then decouples that spring from the gear train. Such a device would allow the motor to drive only the load provided by the damper, valve, or other device being actuated during normal operation. Once power to the actuator is removed, the spring is recoupled to the gear train and the spring drives the output shaft to its predetermined normal position.

SUMMARY OF THE INVENTION

The invention is an apparatus for effecting actuation of a device. The device has a certain range of operation and a home position and a set position within that range, and the apparatus returns the device to the home position upon loss of power to the apparatus. In its preferred embodiment, the apparatus comprises a drive motor for providing a driving force to a drive shaft, and a bias member having a cocking mechanism and a release mechanism. The bias member provides a bias force to a bias shaft when the cocking mechanism is cocked and the release mechanism is released; the release mechanism is released when power is lost to the actuator. The preferred embodiment of the apparatus further comprises a drive member which delivers an actuating force to an actuating shaft in response to forces received on an input shaft. Still further, the apparatus preferably comprises a transmission mechanism coupled with the drive shaft, with the bias shaft, and with the input shaft. The transmission mechanism delivers the driving force to the bias shaft when the input shaft is locked. The transmission member delivers the driving force to the input shaft when the bias shaft is locked. The transmission mechanism delivers the bias force to the input shaft when the drive shaft is locked and the power is lost to the actuator.

In the preferred embodiment, the bias member comprises a spring and the cocking mechanism comprises a solenoid brake which is set when the spring is wound. In this embodiment, the release mechanism engages the brake and is responsive to the power provided to the apparatus; the release mechanism releases the brake when the power is lost.

Further in the preferred embodiment of the present invention, the transmission mechanism includes a planetary gear assembly having a first input-output shaft coupled with the drive shaft, a second input-output shaft coupled with the bias shaft, and a third input-output coupled with the input shaft.

One element of a practical embodiment of the invention is employment of a speed limiting device during the return-to-normal cycle. The bias member may drive the valve or damper at a speed high enough to cause damage when the home position is reached. To prevent this, a speed limiting device in the form of a dynamic brake may be included in the apparatus that applies a retarding torque to counter the force provided by the bias member. The amount of such retarding torque may be directly proportional to the speed at which the bias member drives the bias shaft. One such dynamic brake is a centrifugal brake which is coupled to the bias shaft and is driven by a dedicated gear train. The dedicated gear train may, for example, step up the speed of the bias shaft from about 5 rpm to about 1,000 rpm.

In such an arrangement which uses a centrifugal brake, the brake which locks the bias shaft in position once the spring is wound up actually engages the centrifugal brake. This is advantageous because the braking torque required at the centrifugal brake in such a configuration is much lower than the braking torque which would be required if the centrifugal brake were engaged directly with the bias shaft. Thus, a smaller brake may be employed when the centrifugal brake is coupled as indicated with respect to the brake which locks the bias shaft.

In an alternate embodiment of the present invention, the transmission mechanism employs a differential gear mechanism having a first input-output shaft coupled with the drive shaft, a second input-output shaft coupled with the bias shaft, and a third input-output coupled with the input shaft.

In still another embodiment of the present invention, the apparatus includes at least one of a rotary output head adapted to couple the output gear cluster to the positioning member of a rotatably driven device and a linear output head adapted to couple the output gear cluster to the positioning member of a linearly driven device. In this embodiment, a single apparatus is adapted to selectively actuate one of the rotatably driven device and the linearly driven device.

It is, therefore, an object of the present invention to provide an apparatus for effecting actuation of a device which employs a single motor for providing drive force and for setting a bias member, such as a spring.

A further object of the present invention is to provide an apparatus for effecting actuation of a device which decouples the bias member from the gear train to allow the drive motor to drive only the actuator output shaft during normal operation.

A still further object of the present invention is to provide an apparatus for effecting actuation of a device which automatically allows the bias member to be coupled to the gear train and drive the output shaft to a predetermined home position upon loss of power to the apparatus.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
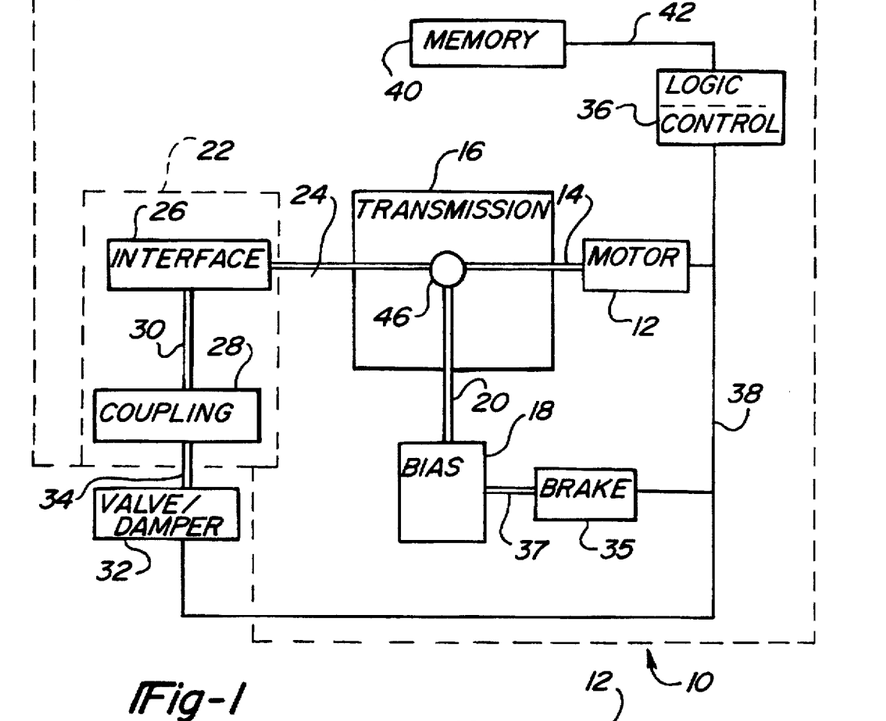
FIG. 1 is a schematic block diagram of the preferred embodiment of the present invention.

FIG. 1 is a schematic block diagram of the preferred embodiment of the present invention.

In FIG. 1, an apparatus 10 is illustrated as including a drive motor 12 connected by a drive shaft 14 to a transmission member 16. Transmission member 16 includes a planetary gear head assembly 46. Transmission member 16 is connected with a bias member 18 via a bias shaft 20, and is connected with a drive member 22 via an input shaft 24.

For purposes of this disclosure, the term "shaft" is intended to include any mechanical coupling such as a solid or hollow shaft, a flexible coupling, a gear train, or the like.

Drive member 22 includes an interface 26 to which input shaft 24 is coupled, and a coupling 28 which is connected with interface 26 via a shaft 30. Drive member 22 is connected with an actuated device, such as a valve or damper 32. The connection between valve 32 and drive member 22 is effected by an actuating shaft 34. A brake 35 is coupled with bias member 18 via a coupling 37. A logic/control device 36 is coupled via a network 38 with drive motor 12 and brake 35. Logic/control device 36 may also be coupled with valve 32. A memory 40 is coupled with logic/control device 36 via a line 42.

Figure 2:
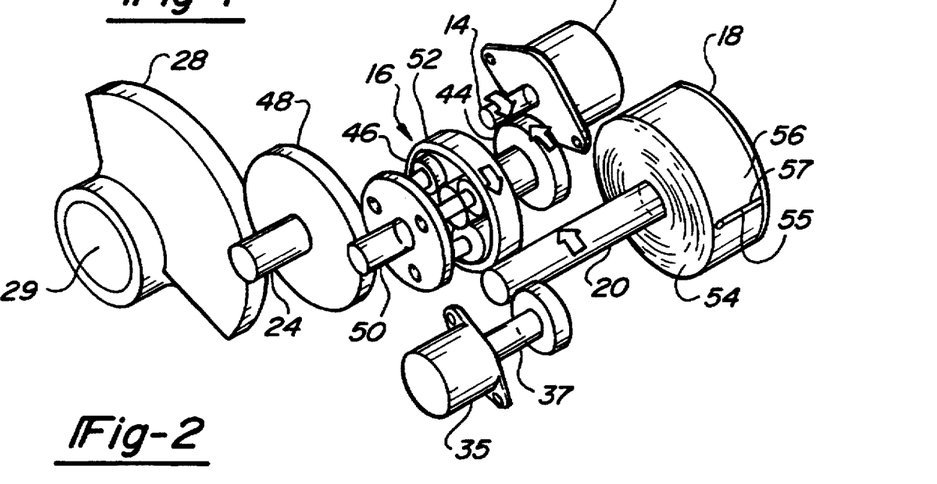
FIG. 2 is a schematic perspective illustration of details of the drive train of the preferred embodiment of the present invention when the input shaft is locked and the motor is winding the spring.

FIG. 2 is a schematic perspective illustration of details of the drive train of the preferred embodiment of the present invention when the input shaft is locked and the motor is winding the spring.

In order to facilitate understanding the present invention, like elements will be indicated using like reference numerals in the various drawings.

In FIG. 2, drive motor 12 rotates drive shaft 14 to transmit rotational force to transmission member 16. Transmission member 16 is coupled with bias shaft 20; bias shaft 20 is connected with bias member 18. A brake 35 is coupled via a coupling 37 with bias member 18; in the embodiment illustrated in FIG. 2, coupling 37 is connected with bias member 18 via bias shaft 20. Transmission member 16 is further connected with input shaft 24 which transmits rotational forces to coupling 28 for further transfer via actuating shaft 34 (not shown in FIG. 2). Coupling 28 is representatively illustrated as a sector gear in FIG. 2. Actuating shaft 34 is preferably configured for coupling with coupling 28 via an aperture 29 in order to establish connection between valve 32 (not shown in FIG. 2) and actuator 28.

Of particular interest in FIG. 2 is the illustration of the preferred embodiment of transmission member 16. In particular, transmission member 16 is comprised of a drive gear 44 which is engaged with drive shaft 14. Drive gear 44 receives rotational force imparted by drive shaft 14 and transmits that rotational force to a planetary gear head assembly 46. Planetary gear head assembly 46 interacts with a transmission gear 48 via a shaft 50 to impart rotational motion to input shaft 24 under appropriate circumstances to be described in greater detail hereinafter.

As previously established, FIG. 2 illustrates details of the drive train embodying transmission member 16 of the preferred embodiment of the present invention when input shaft 24 is locked. Input shaft 24 may become locked during particular operations of apparatus 10 (FIG. 1) such as when valve 32 is fully traveled to one extreme or the other of its available travel. Such movement by a valve to an extreme of its available travel may occur, for example, when valve 32 reaches a predetermined home position or a predetermined upper limit set position.

In operation, such a home position may, for example, be a normally open or a normally closed position establishing one extreme of the travel of valve 32. The set position may be any position other than the home position, but commonly is the other extreme of travel of the valve 32 from its predetermined home position. Thus, when an extreme of travel of valve 32 is reached, actuating shaft 34 (FIG. 1) cannot further rotate in the direction urging valve 32 toward its limit. Consequently coupling 28 and input shaft 24 are effectively locked. It is under such conditions that the characteristics of planetary gear head assembly 46 are advantageously employed in the present invention.

A planetary gear head assembly operates to transmit rotation forces among its input/output couplings, depending upon which of those input/output couplings may be locked. In the situation illustrated in FIG. 2 planetary gear head 46 has three input/output couplings: drive shaft 14, bias shaft 20, and input shaft 24. When input shaft 24 is locked (as when valve 32 has reached a limit of its travel), rotational force from drive shaft 14 in, for example, a clockwise direction (FIG. 2) is transmitted to drive gear 44. Drive gear 44 is urged to rotate in a counterclockwise direction and, since input shaft 24 is locked, planetary gear and assembly 46 will transmit a rotational force in a clockwise rotation via its stator ring 52. In turn, stator ring 52 will urge bias shaft 20 in a counterclockwise direction. A spring 54, which comprises the preferred embodiment of bias member 18, is oriented within a stationary case 56 appropriately that counterclockwise rotation of bias shaft 20 serves to wind up spring 54 within case 56, thereby storing kinetic energy in bias member 18. During such winding up operations, brake 35 is controlled by logic/control member 36 via network 38 (FIG. 1) to remain deenergized, and coupling 37 rides with respect to bias shaft 20 in a manner similar to an idler gear or cam.

Figure 3:
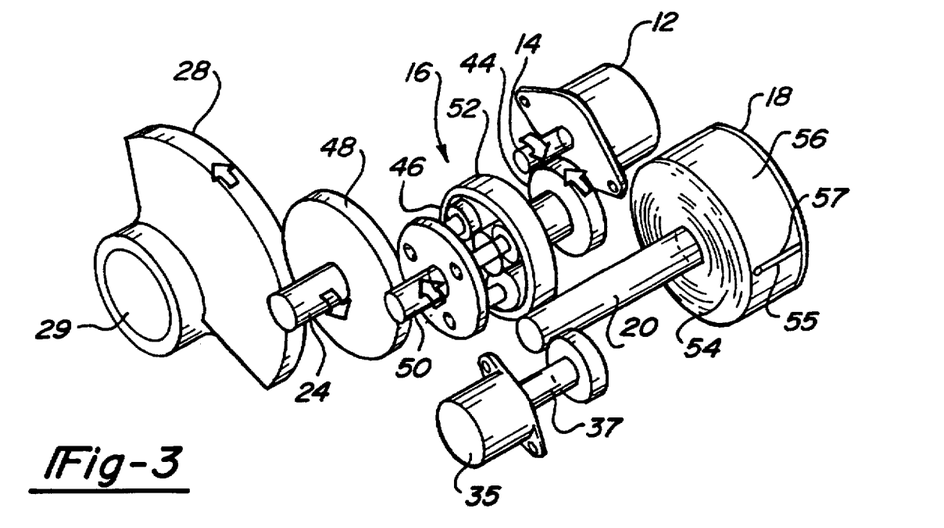
FIG. 3 is a schematic perspective illustration of details of the drive train of the preferred embodiment of the present invention during normal operation.

FIG. 3 is a schematic perspective illustration of details of the drive train of the preferred embodiment of the present invention during normal operation. In FIG. 3, spring 54 has been wound. Logic/control member 36 has sensed the state of spring 54 and has communicated via network 38 with brake 35 so that brake 35 is set. Coupling 37 interacts with bias shaft 20 to lock bias shaft 20 and prevent transmission of kinetic energy stored in spring 54 via bias shaft 20 to planetary gear head assembly 46. In such normal operation, valve 32 (FIG. 1) is freely moving between its home position and its set position, that is within its limits of travel. Thus, actuating shaft 34, engaging aperture 29 of coupling 28, is free to move in either a counterclockwise or a clockwise direction to open, close or otherwise position valve 32 within its limits of travel. Accordingly, for illustration purposes, in FIG. 3 drive motor 12 is rotating drive shaft 14 in a clockwise direction to urge drive gear 44 in a counterclockwise direction. Since bias shaft 20 is now locked against rotation by brake 35 and coupling 37, planetary gear head assembly 46 has its stator ring 52 locked and, therefore, transmits forces received via drive gear 34 to shaft 50. Shaft 50 rotates in a counterclockwise direction and interacts with transmission gear 48 to impart a clockwise rotation to input shaft 24. Input shaft 24 interacts with coupling 28 to impart a counterclockwise rotation to actuating shaft 34 (not shown in FIG. 3) interfitting in aperture 29 of coupling 28. Similarly, drive motor 12 may impart a counterclockwise rotation to drive shaft 14, and so long as valve 32 is still within its travel limits and thus no locking out of actuating shaft 34 occurs, such a counterclockwise rotation imparted to drive shaft 14 will result in a clockwise rotation of coupling 28 and clockwise rotation of actuating shaft 34.

Figure 4:
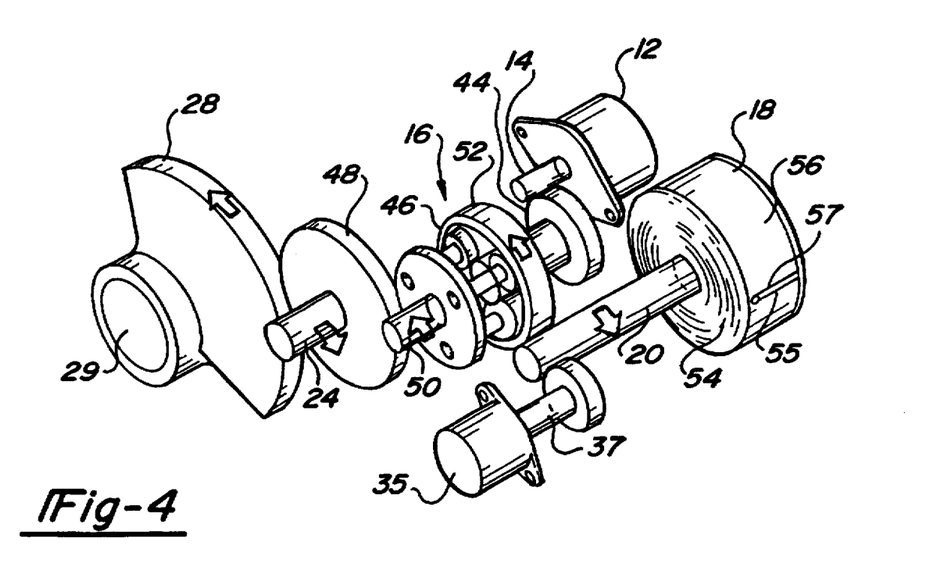
FIG. 4 is a schematic perspective illustration of details of the drive train of the preferred embodiment of the present invention when power is lost, the spring brake is released, and the spring is returning the valve or damper to the home position.

FIG. 4 is a schematic perspective illustration of details of the drive train in the preferred embodiment of the present invention when power is lost, the spring brake is released, and the spring is returning the valve or damper to the home position.

In FIG. 4, power has been lost to apparatus 10. The detent torque of drive motor 12 is designed to be sufficient to preclude turning drive shaft 14 by forces which may be applied to drive shaft 14 by the apparatus illustrated in FIG. 4 or by hand. Consequently, drive shaft 14 is effectively locked against rotation. The loss of power to drive motor 12 is sensed by logic/control device 36 via network 38, and logic/control device 36 effects unlocking of brake 35 via network 38 in response to such loss of power.

The return-to-normal cycle begins when power is lost to actuator 10. In an application when, for example, power is lost in a building, some valves and dampers must return to a home position to avoid damage to the building or discomfort to the building's occupants. Even though some return-to-normal actuators may have their brakes released by a logic/control device, it is more reliable to design the brake to release on its own upon loss of power. Thus, in the preferred embodiment of apparatus 10, brake 35 is a solenoid brake which is kept in an engaged (i.e., braking) orientation by the power supplied to apparatus 10. In such a configuration, loss of power to apparatus 10 automatically releases brake 35.

With brake 35 released, coupling 37 no longer locks bias shaft 20 and kinetic energy stored in spring 54 can now be released to impart a clockwise rotation to bias shaft 20 (note that the rotation to release kinetic energy (FIG. 4) is effected in a direction opposite to the direction of rotation of bias shaft 20 in imparting or storing kinetic energy in spring 54 (FIG. 2)). Clockwise rotation of bias shaft 20 is imparted to planetary gear head assembly 46 via its stator ring 52 urging stator ring 52 to rotate in a counterclockwise direction. Since drive shaft 14 is locked, drive gear 44 is locked, and, therefore, planetary gear head 46 transmits rotational force applied to its stator ring 52 to shaft 50 to rotate shaft 50 in a counterclockwise direction. Counterclockwise rotation of shaft 50 imparts a clockwise rotation to transmission gear 48 and input shaft 24 which, in turn, imparts a counterclockwise rotation to coupling 28. Consequently, actuating shaft 34 (not illustrated in FIG. 4) via its fitting within aperture 29, is rotated counterclockwise. It is preferred that such counterclockwise rotation of coupling 28 effect return of valve 32 to its predetermined home position (either normally open or normally closed) via rotation of actuating shaft 34.

Thus, a single drive motor 12 is used to transmit appropriate energy selectively to a bias member 18, such as a spring 54, or to an actuating shaft 34 via a coupling 28, depending upon whether input shaft 24 is locked or unlocked. Planetary gear head assembly 46 further operates to transmit bias force from bias member 18 when brake 35 is released, via bias shaft 20, through planetary gear head 46, to coupling 28 when drive shaft 14 is locked, such as when power is lost.

Figure 5:
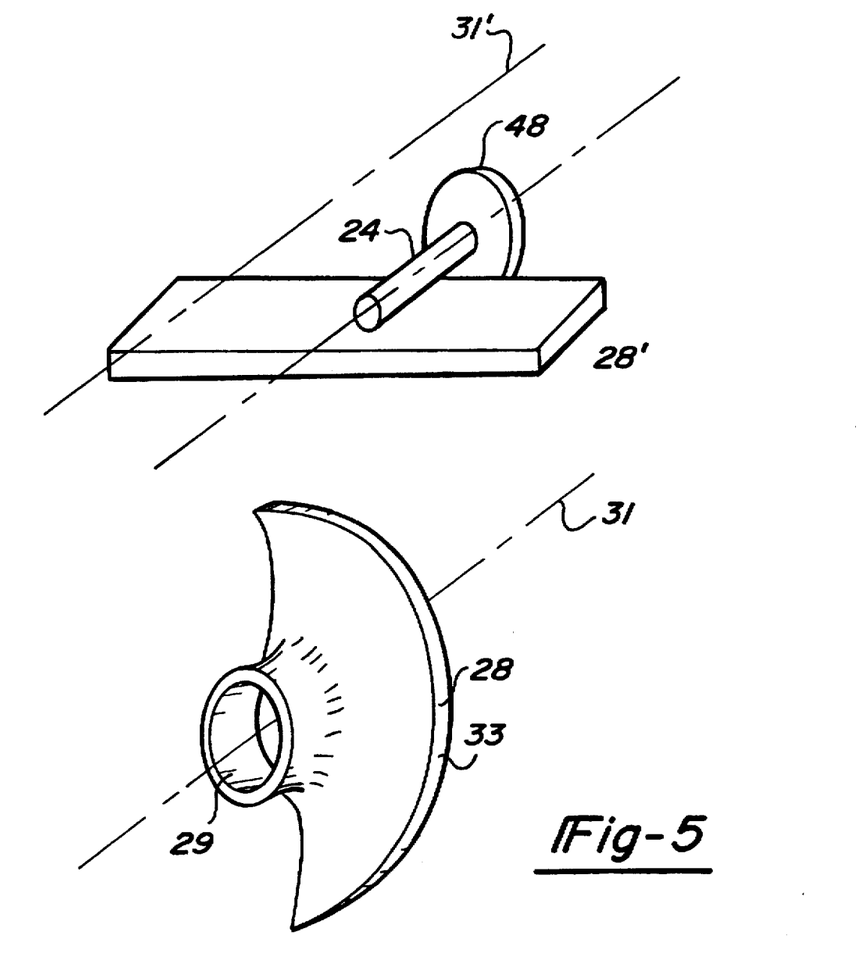
FIG. 5 is a schematic perspective illustration of alternate output arrangements available for use with the preferred embodiment of the present invention.

FIG. 5 is a schematic perspective illustration of alternate output arrangements available for use with the preferred embodiment of the present invention.

In FIG. 5, transmission gear 48 and its attached input shaft 24 are illustrated as being configured for providing input to a drive member 22 (FIG. 1) via a rack and pinion arrangement through a rack 28'. Thus, a pinion gear (illustrated schematically in FIG. 5) may be attached to or incorporated into input shaft 24, and rack 28' may be appropriately configured for engaging interaction with the pinion gear of input shaft 24 to provide a rack and pinion coupling to a drive member 22 for apparatus 10. Appropriate configuration of apparatus 10, with room to allow rack 28' to be slidingly disengaged from the pinion gear associated with input shaft 24, facilitates replacement of rack 28' with a sector gear coupling 28. Axis 31 of coupling 28 may be substantially aligned with an axis 31' to facilitate meshing engagement of a face 33 of coupling 28 with the pinion gear associated with input shaft 24. In such manner, quick change of an actuating arrangement between a rack and pinion coupling arrangement and a sector gear coupling arrangement may be easily and quickly effected.

Thus, the invention is a return-to-normal apparatus 10 usable for actuating devices such as a valve or damper 32. Apparatus 10 initially winds an internal return spring 54 and then decouples spring 54 from input shaft 24 to drive member 22. Thus, a single drive motor 12 drives the load (e.g., valve 32) and only the load applied to input shaft 24 to drive member 22 during normal operation. Once power to apparatus 10 is removed, spring 54 is coupled to input shaft 24 and spring 54 drives valve 32 to its predetermined normal position, such as a normally open or a normally closed position. In its preferred embodiment, the apparatus has both a linear (e.g., rack and pinion) version and a rotary (e.g., sector gear) version. Apparatus 10 is preferably directly mounted to a valve or damper 32 and employs a small stepper motor and a spring, approximately 2¼ inches in diameter and ½ inch thick. Most parts from the linear version are used in the rotary version. Spring 54 moves only during the return-to-normal cycle, and during a subsequent recovery cycle when the spring is rewound.

Transmission member 16 includes a gearing mechanism, preferably in the form of a planetary gear head assembly 46, which splits the power from drive motor 12 in two paths: A first path to input shaft 24, and a second path to bias shaft 20. When drive shaft 14 is locked, a third path is formed through planetary gear head assembly 46 between bias member 18 via bias shaft 20 and input shaft 24 to drive member 22.

In normal operation, after spring 54 has been wound, and that wound state is sensed by logic/control device 36 via network 38, spring 54 is held stationary by brake 35. Brake 35 is preferably embodied in a solenoid brake. Thus, in normal operation, drive motor 12 is free to actuate valve 32 (or damper) without having to wind and unwind spring 54. When drive member 22 is not being commanded to move, drive motor 12 has sufficient detent torque to hold valve 32 (or damper) in position.

Under return-to-normal operation (e.g., during power failure), brake 35 loses power, which loss of power is sensed by logic/control device 36 via network 38. As a result, logic/control device 36 releases solenoid brake 35 which consequently releases spring 54. Alternately, the solenoid of brake 35 may be directly powered by the power source for apparatus 10. In such case, a loss of electrical power will cut power to the solenoid, which will release brake 35. The detent torque of drive motor 12 is sufficient to prevent drive motor 12 from turning in response to the bias force applied to bias shaft 20 so that power from spring 54 is routed to input shaft 24, through drive member 22, thus returning valve 32 to its home position.

When power is restored after a power failure, or upon initial energization of apparatus 10, brake 35 is not immediately energized. First, spring 54 must be wound or rewound. This winding or rewinding is done by energizing drive motor 12 to move in a direction which urges valve 32 to its home position. Once valve 32 reaches its home position (a limit of its travel), input shaft 24 is effectively locked and power from drive motor 12 will be transferred to spring 54 (FIG. 2). Drive motor 12 then proceeds to wind up spring 54 a predetermined number of turns (controlled by logic/control device 36) to effect appropriate winding of spring 54. Preferably, spring 54 is only wound far enough to enable spring 54 to return valve 32 (or damper) to its home position. Torque produced by spring 54 increases as spring 54 is wound further. The more torque produced by spring 54, the greater the stress experienced by spring 54. Drive member 22 and spring 54 are designed for a maximum stroke, but most valves and dampers have stroke less than this maximum. Because logic/control device 36 "knows" what the stroke of valve 32 (or damper) actually is, winding spring 54 completely can be avoided. This will also reduce stresses on transmission member 16 and on valve 32 (or damper).

Once winding or rewinding is accomplished, brake 35 is energized to hold spring 54 in its wound position. Thus, in the preferred embodiment, brake 35, through coupling 37, engages and holds bias shaft 20 and effectively removes spring 54 from the power path through transmission member 16. That is, any further movement imparted by drive motor 12 to transmission member 16 via drive shaft 14 will now be transferred to input shaft 24 (FIG. 3).

Preferably, apparatus 10 is shipped with spring 54 completely unwound within its case 56. Further, apparatus 10 is preferably shipped with actuator shaft 34 at either of its extremes of travel. Input shaft 24, as previously described, will not be movable by hand because of the detent torque of drive motor 12.

After valve 32 (or damper) is attached to actuator shaft 34, apparatus 10 is ready to be turned on for the first time, and logic/control device 36 must execute an initialization routine. In such an initialization routine, it is presumed that spring 54 is completely unwound. Brake 35 is first energized to keep spring 54 from being wound. Drive motor 12 is energized in the direction that moves valve 32 away from the home position until drive motor 12 stalls. Logic/control device 36 assumes that the position at which drive motor 12 stalls is the extreme of valve 32 travel away from the home position. Drive motor 12 is then cycled in the opposite direction until it stalls. Logic/control device 36 presumes that this position of second stalling of drive motor 12 is the home position of valve 32.

Logic/control device 36 preferably counts steps from the position reached at extreme of travel away from the home position by valve 32 until valve 32 reached the home position. Thus, logic/control device 36 now "knows" that valve 32 (or damper) is in the home position, and further knows the number of steps to traverse a full stroke from one extreme of travel to the other extreme of travel by valve 32. Logic/control device 36 saves this stroke length in memory 40 (FIG. 1), preferably a permanent non-volatile memory.

After having cycled valve 32 back to the home position, as described above, the initialization routine continues as brake 35 is deenergized and drive motor 12 continues to turn in a direction to drive valve 32 to the home position. Since valve 32 is already home, motor power from drive motor 12 will be transferred by planetary gear head assembly 46 to bias shaft 20 and, ultimately, to spring 54 as described above. Thus, spring 54 will be wound. Drive motor 12 will turn bias shaft 20 a programmed number of turns to fully wind spring 54. At this point in the initialization routine, brake 35 is energized to lock spring 54 in position. This completes the initialization routine. If at any future time apparatus 10 is removed from valve 32, the initialization routine will have to be rerun.

It is important to note that brake 35 is not based on a separate DC motor, as in some prior art designs of such actuators. Brake 35 in the preferred embodiment of the present invention is based on a solenoid. One advantage of such a configuration is that brake 35 does not require circuitry to discharge a capacitor through drive motor 12 to release spring 54. Spring 54 is instead released automatically upon interruption of power to the solenoid associated with brake 35. Of course, it may be advisable to place a capacitor across the solenoid of brake 35 to prevent nuisance trips. Once brake 35 is released and spring 54 begins to return valve 32 to its home position, apparatus 10 preferably should be allowed to complete the return-to-normal cycle so that logic/control device 36 "knows" where spring 54 is and where valve 32 is.

A particular advantage of the preferred embodiment of the present invention is that it is possible to change the home position for stem-up or stem-down configuration, or to change from clockwise to counterclockwise actuation very easily. To facilitate such a change, spring 54 is generally shipped in an unwound condition. That is, spring 54 is loosely contained within case 56 and engages case 56 by a tab 55 in a slot 57. Thus, to change the action of apparatus 10 from one direction to another (e.g., from stem-up to stem-down, or from clockwise to counterclockwise), one must detach (or not yet have attached) apparatus 10 from valve 32. Power to apparatus 10 must be off, and spring 54 must be completely unwound. Tab 55 is disengaged from slot 57 to facilitate removal of spring 54 from case 56. Spring 54 may then be rotated 180 degrees, reinserted in case 56, and tab 55 reengaged with slot 57. In such manner, the direction for winding spring 54 is reversed so that the return-to-normal force provided by unwinding spring 54 and transmitted through bias shaft 20 is reversed. Apparatus 10 should, in such a configuration, provide a switch, or jumper, or other means by which an installer can indicate to logic/control device 36 in which direction the home position is located.

In the preferred embodiment of the present invention, a manual override is provided by which a pinon is attached to a thumb wheel (not shown) accessible to a user. When the thumb wheel is pushed in, the pinion engages one of the gears between drive motor 12 and planetary gear head assembly 46, and a lever applies braking pressure to return spring 54. If the thumb wheel is then turned, while still being pushed inward, drive motor 12 and valve 32 will also move (spring 43 being held stationary). In such manner, valve 32 can be moved manually whether or not there is power to apparatus 10. It is important to note that a user operating such a manual override with the present invention does not have to overcome the torque of spring 54, since spring 54 is locked by brake 35. A small catch near the thumb wheel can be used to latch the thumb wheel in place so that apparatus 10 can remain in a predetermined position indefinitely. If drive motor 12 starts to turn because of an application of electrical power while the manual override is in such a latched condition, the manual override is configured to automatically unlatch and apparatus 10 will then return to a normal non-override condition.

Further in the preferred embodiment of the present invention, apparatus 10 is converted from linear operation to rotary operation very simply as follows. Input shaft 24 has incorporated or mounted thereon a pinion gear (schematically illustrated in FIG. 5) for engaging a sector gear such as actuator 28 for rotary motion. Preferably, the frame of apparatus 10 is designed to attach either to a casting to which a valve is attached or to a casting enclosing a hollow output shaft and sector gear to which a damper is attached. Either casting may be attached to apparatus 10 with screw(s). Conversion from linear actuation to rotary actuation is accomplished simply by removing the casting which attaches to valves by removing appropriate screw(s), sliding out the rack assembly by using the manual override mechanism described above, and then attaching the casting which encloses the output shaft and sector gear by reinstalling appropriate screw(s). Any associated auxiliary switches, or feedback potentiometers, or other sensors associated with apparatus 10 must then be reset to correctly reflect the converted apparatus 10 as been mounted to a valve 32 or a damper.

Figure 6:
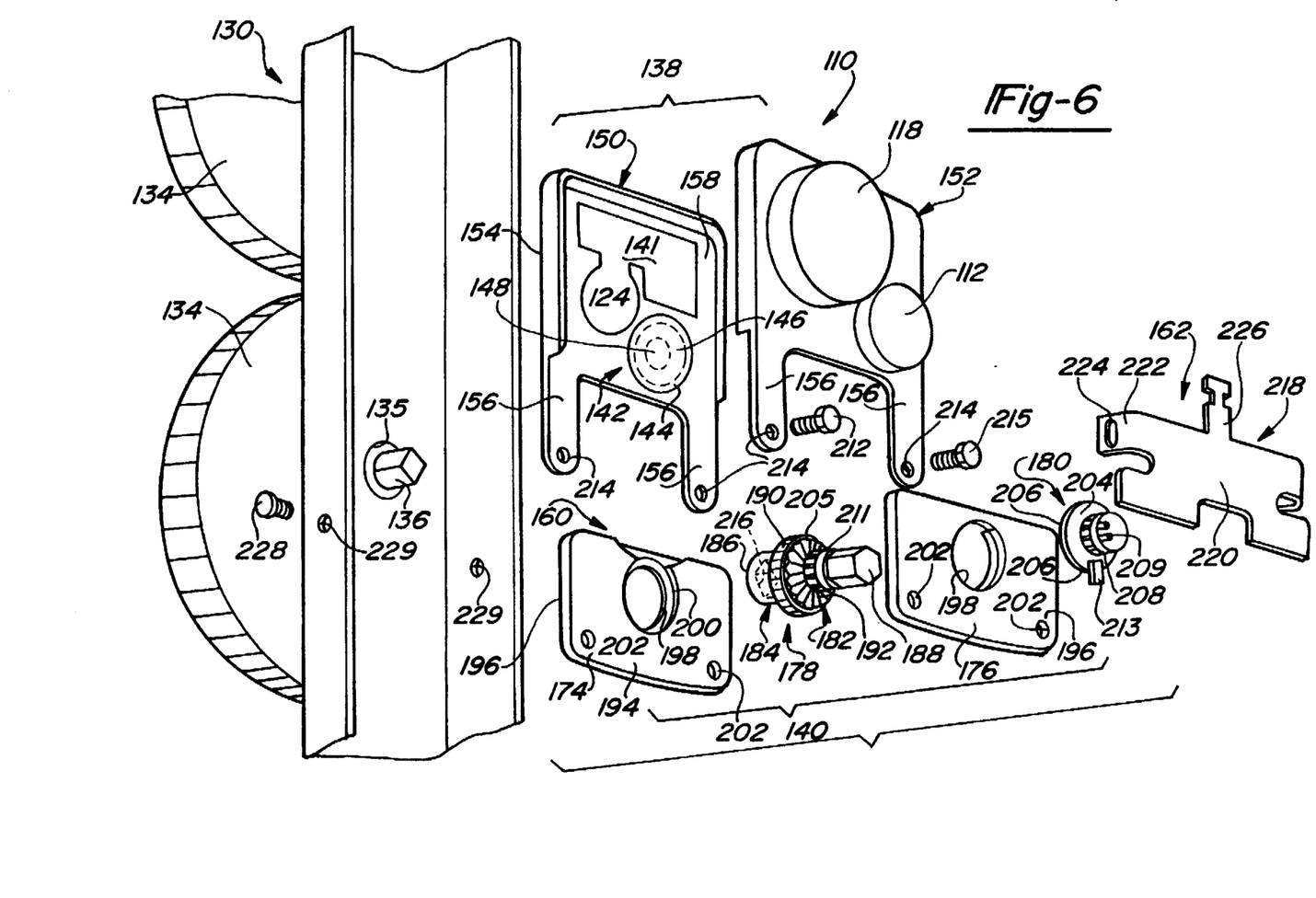
FIG. 6 is an exploded perspective view of the modular actuator configured to rotate a gear damper.

FIGS. 6–14 illustrate a modular actuator apparatus incorporating the heretofore described return-to-normal operation and arrangeable to selectively provide linear and rotational actuation of a variety of driven devices. As best seen in FIG. 6, modular actuator apparatus 110 generally includes a base 138 and an output head 140. Base 138 accommodates the previously described working components of the return-to-normal actuator hereinafter generally referred to as a gear train 141 that includes the input shaft 24, transmission 16, drive shaft 14, bias shaft 20, bias member 18, coupling 37, and brake 35 as previously described and schematically illustrated in FIG. 1. Actuator apparatus 110 also includes a drive member 22 which, in the preferred modular embodiments shown in FIGS. 6–14, includes an output gear cluster 142 coupled to base 138 for rotation relative thereto and positioned to cooperate with output head 140 to drive the driven member, e.g., drive shaft 136 of gear damper 130.

Figure 13:
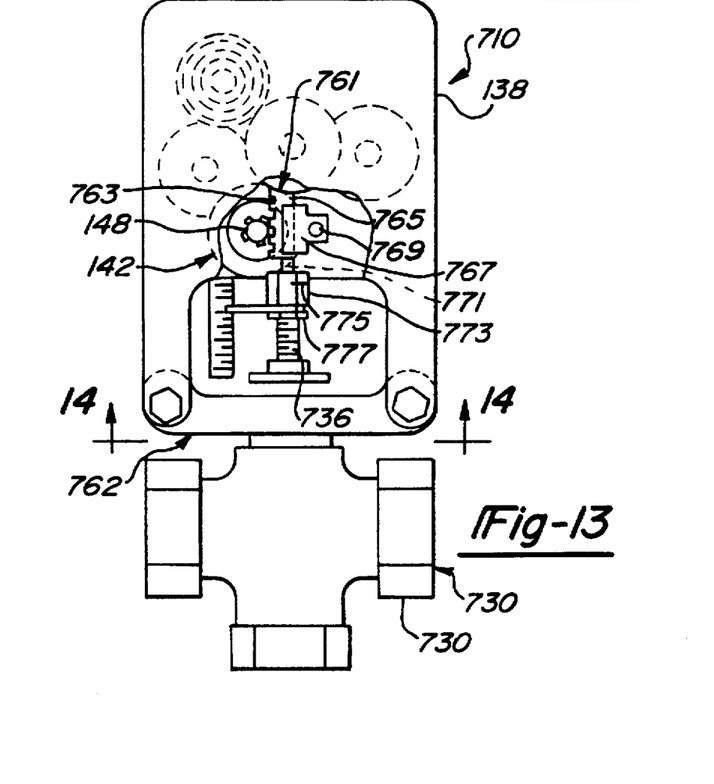
FIG. 13 is a plan view of the modular actuator configured for linear actuation of a valve wherein a portion of the actuator base is removed for clarity.
Figure 14:
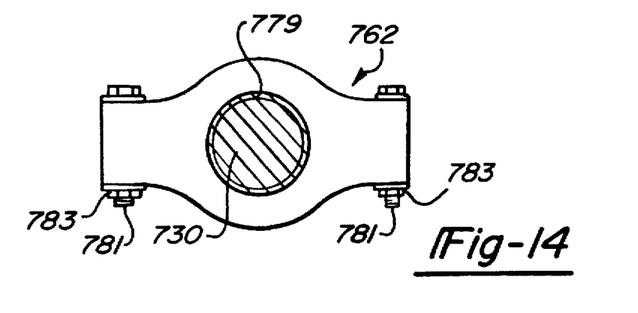
FIG. 14 is a sectional view taken at the location 14—14 shown in FIG. 13.

Those skilled in the art will appreciate that input shaft 24, shown in FIG. 6 as a toothed gear 124, rotatably drives output gear cluster 142 in the manner previously described so as to provide return-to-normal operation. In the preferred embodiment, output gear cluster 142 includes an input gear 144 having a toothed portion engageable with input shaft 24, a rotary drive gear 146 engageable with a rotary output head, and a pinion gear 148 engageable with a rack such as that shown in FIGS. 5 and 13 for driving a linearly driven device. FIGS. 6–12 show specific embodiments wherein the modular actuator is arranged to drive a rotatable device whereas FIGS. 13 and 14 show the actuator in a linear configuration.

With specific reference to FIG. 6, base 138 preferably includes first and second plate-like members 150 and 152 each having a body portion 154 and a pair of legs 156. First and second members 150 and 152, respectively, are connected to one another such that body portions 154 cooperate to house gear train 141 and legs 156 accommodate a variety of output heads as hereinafter described. Output gear cluster 142 is connected to an inner surface 158 of first member 150 for rotation relative thereto while a drive motor 112 and bias member 118 are mounted to second member 152. It will be appreciated that drive motor 112 and bias member 118 are coupled to the appropriate components of gear train 141 such as through a drive shaft 14 and a bias shaft 20 as previously described.

Figure 7:
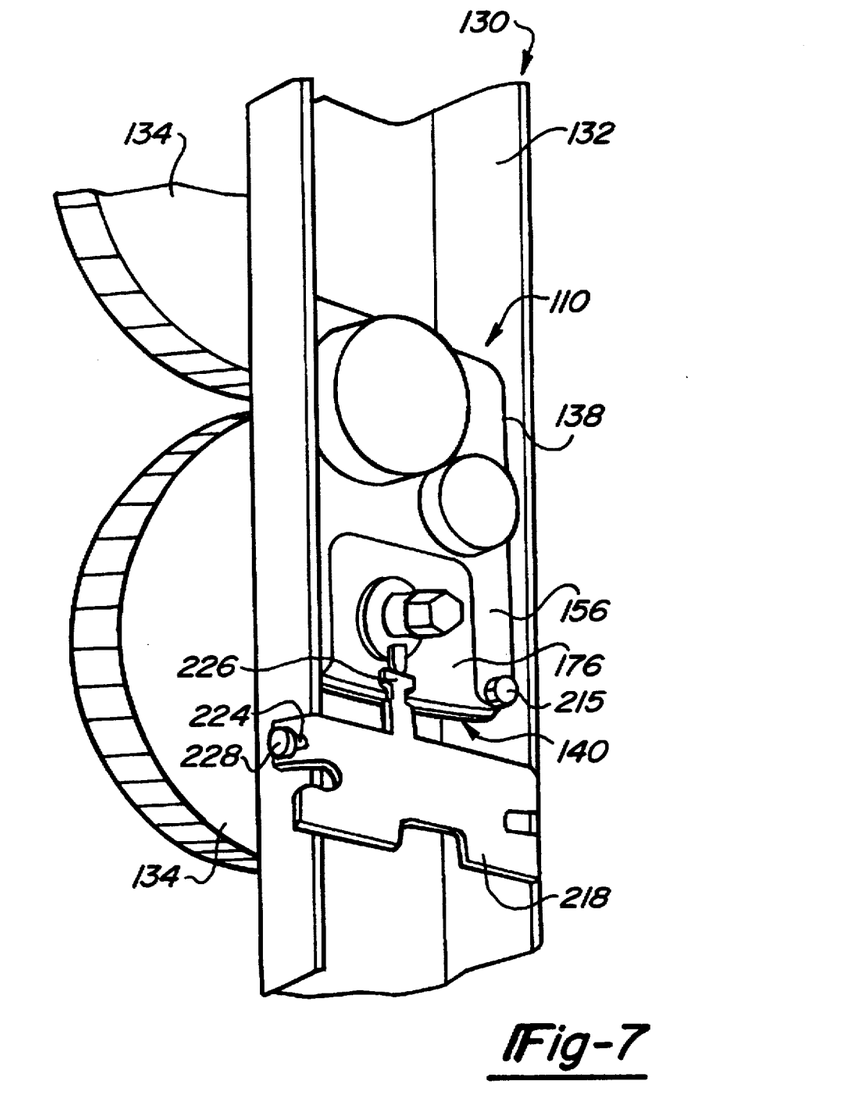
FIG. 7 is a perspective view of the modular actuator shown in FIG. 6 assembled and mounted to the gear damper.

Modular actuator apparatus 110 generally includes base 138 and output head 140 as well as optional modular components connectable for use with the actuator including, as shown in FIGS. 6 and 7, a support frame 160 and an attachment assembly 162 (also indicated at 562 in FIG. 11, 662 in FIG. 12, and 762 in FIG. 14) for connecting the actuator to the driven device. Further modular components illustrated in the drawings and described herein include a manual override assembly 564 (FIG. 11), a motion limiting apparatus 266, 466 (FIGS. 8 and 10, respectively), and a conduit connector 468 (FIG. 10) mountable to base 138 for connecting a wiring conduit thereto. While many of the above-referenced modular components are illustrated only in certain specific embodiments, one skilled in the art will appreciate that the modular components may generally be included with or eliminated from each of the embodiments as dictated by the desired operation of the actuator apparatus. It should also be noted that while the modular components used in the respective embodiments vary with the specific applications, the actuator base 138, gear train 141, and output gear cluster 142 remain unchanged.

As illustrated in FIGS. 6 and 7, modular apparatus 110 is configured to rotatably drive a gear damper 130 having a frame 132 and a plurality of intermeshed gears 134 coupled for rotation relative to frame 132. Frame 132 includes an aperture 135 accommodating a drive shaft 136 of one of gears 134 (FIG. 6). Apparatus 110 is adapted as hereinafter described to rotatably couple gear drive shaft 136 to output gear cluster 142 and includes an attachment assembly 162 for connecting actuator 110 to frame 132.

With specific reference to FIG. 6, output head 140 is connected to base 138 by a support frame 160 that includes first and second support members 174 and 176, respectively. Output head 140 also includes an output hub 178 having a drum 182 and a shaft 184 with a first shaft end 186 configured to cooperate with gear drive shaft 136 and a second shaft end 188. Drum 182 of output hub 178 includes an outer radial face having radially projecting gear teeth 190 engageable with rotary drive gear 146 of output gear cluster 142. Drum 182 and shaft 184 may be integrally formed so as to create a continuous output hub 178 or, alternatively, separate components connected to one another for common rotation as illustrated in FIG. 6 and hereinafter described.

First and second support members 174 and 176, respectively, of support frame 160 each generally define an inner face 194, an outer face 196, a shaft aperture 198 surrounded by a recess 200, and, preferably, mounting apertures 202. Shaft apertures 198 of first and second support members 174 and 176, respectively, are sized to accommodate first and second shaft ends 186 and 188, respectively. Recesses 200 of first and second support members 174 and 176, respectively, cooperate to define a pocket within which drum 182 is disposed for intermeshed engagement with rotary drive gear 146. In the preferred embodiment of the gear damper actuator 110 shown in FIG. 6, drum 182 of output hub 178 includes an annular engagement face 205 that contacts support member 176 adjacent shaft aperture 198 to limit the axial movement of output hub 178 relative to support frame 160 and base 138. In order to reduce the frictional forces developed between hub 178 and support member 176, first and second support members 174 and 176 are preferably formed of a self-lubricating acetal homopolymer such as DELRIN™ manufactured by DuPont of Wilmington, Del.

In those instances where drum 182 and shaft 184 are formed as separate components, the axial position of output hub 178 relative to support frame 160 is secured by a lockwasher 180 which includes a ring-shaped body 204 having a pair of annularly projecting teeth 206 spaced 180° apart, an annular flange 208 having shaft engagement teeth 209, and a radial tab 213. Drum 182 includes annular teeth 192 that cooperatively engage teeth 206 protruding from lockwasher 180 to fix lockwasher 180 relative to drum 182. Similarly, shaft 184 includes a toothed portion 211 engageable with shaft engagement teeth 209 on lockwasher 180. The relative positions of lockwasher 180, drum 182, and shaft 184 allows drum 182 to be fixed for rotation with shaft 184 in a variety of positions.

Output head 140 is assembled by placing first and second support members 174 and 176 in mating correspondence about hub 178 and, optionally, connecting lockwasher 180 to shaft 184 and drum 182. Following assembly, output head 140 is disposed between the opposing pairs of legs 156 extending from base 138 and is secured thereto by screws 215 cooperating with apertures 214 formed in legs 156 and apertures 202 in support frame 160. Modular actuator 110 may then be positioned adjacent support frame 132 such that a recess 216 formed in first end 186 of output shaft 184 cooperates with similarly configured gear drive shaft 136. It should be appreciated by those skilled in the art that a variety of gear drive shaft and actuator output shaft configurations may be used in conjunction with modular actuator 110 to provide actuation of a variety of rotatably driven devices.

Modular actuator 110 may be secured to a stationary component of the rotatably driven device, such as frame 132 of gear damper 130, through the use of an attachment assembly 162 such as, for example, an attachment bracket 218. Attachment bracket 218 includes a body 220, at least one flange 222 defining an aperture 224, and a tab 226. As best seen in FIG. 7, screws 228 cooperate with apertures 229 formed in frame 132 and apertures 224 in bracket 218 to secure bracket 218 to frame 132. In this arrangement, tab 226 engages second support member 176 to urge actuator 110 against frame 132. It should be appreciated by those skilled in the art that a multitude of equivalent attachment assemblies 162, including simply directly connecting base 138 to damper frame 132 with a screw, may be used without departing from the scope of the invention set forth in the appended claims.

Figures 8, 9:
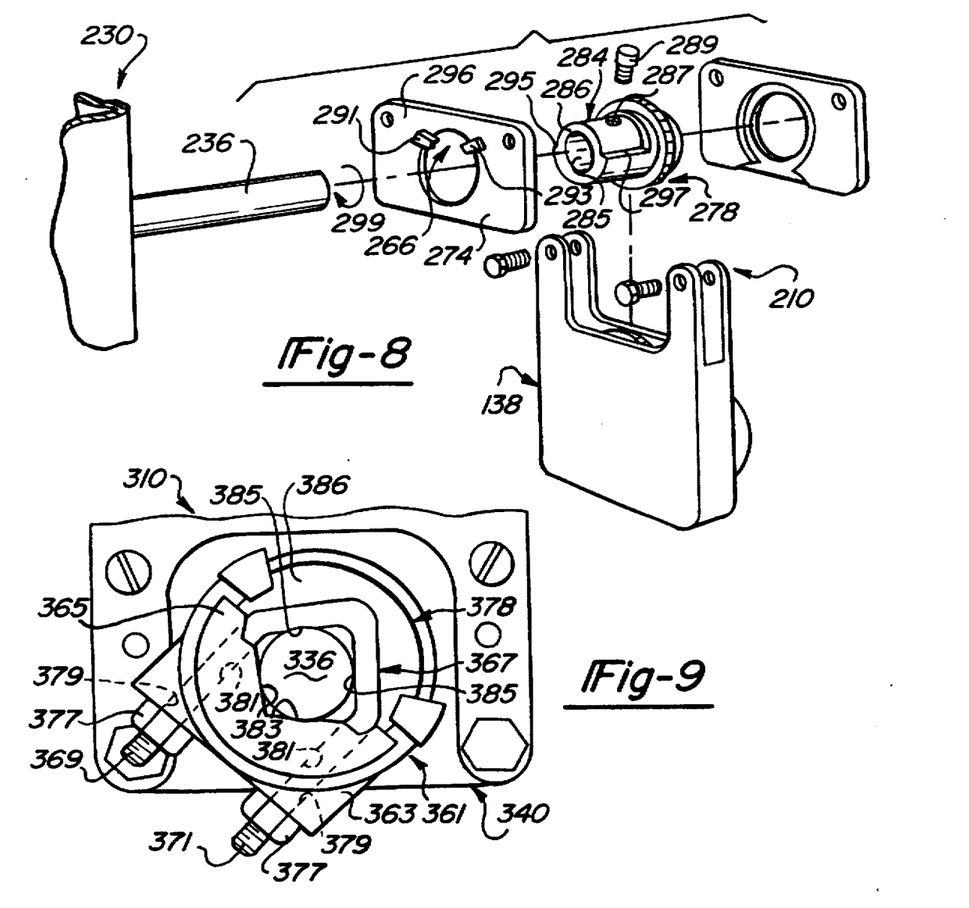
FIG. 8 is an exploded perspective view of the modular actuator configured to rotate a cylindrical shaft.
FIG. 9 is a partial plan view of the modular actuator in an alternate configuration for rotating a cylindrical shaft.

FIGS. 8 and 9 show two contemplated output head configurations for use with rotatably driven devices having cylindrical drive shafts such as a linkage damper 230. In the configuration shown in FIG. 8, output shaft 284 of output hub 278 defines a through-extending axial bore 285 and an internally threaded radial aperture 287 communicating with bore 285 and threadably engageable by an externally threaded set screw 289. FIG. 8 also illustrates a motion limiting apparatus 266 partially defined by stop tabs 291 and 293 secured to first support member 274. Output shaft 284 defines first and second radial faces 295 and 297, respectively, proximate to the first end 286 of output shaft 284 to further define motion limiting apparatus 266.

After cylindrical drive shaft 236 is disposed within through-extending axial bore 285 and secured for rotation therewith via set screw 289 in a manner known in the art, the angular displacement of hub 278 and circular drive shaft 236 is limited by the abutment of first and second radial faces 295 and 297, respectively, against stop tabs 291 and 293, respectively. Specifically, the angular displacement of output hub 278 and drive shaft 236 is limited in the direction indicated by arrow 299 by the abutment of first radial face 295 against first stop tab 291. Similarly, the angular displacement of output hub 278 and cylindrical drive shaft 236 is limited in the rotational direction opposite arrow 299 by second radial face 297 abutting second stop tab 293. It should be appreciated by those skilled in the art that when output head 240 is assembled and secured to base 138 of modular actuator apparatus 210, aperture 287 and set screw 289 are located between first face 296 of first support member 274 and linkage damper 230.

FIG. 9 illustrates an alternate embodiment for connecting modular actuator 310 to a driven device having a cylindrical drive shaft 336. Specifically, a European U-bolt coupling 361 secures cylindrical drive shaft 336 to output hub 378. U-bolt coupler 361 includes a base 363 connected to first shaft end 386, a seat 365 cooperatively disposed on base 363, and a U-shaped coupler rod 367 having first and second partially threaded legs 369 and 371, respectively, cooperative with internally threaded nuts 377. It should be appreciated by those skilled in the art that output hub 378 is disposed within output head 340 to engage output gear cluster 142 (not shown) as heretofore described. Moreover, base 363 and seat 365 each include openings 379 and 381, respectively, that accommodate legs 369 and 371. Cylindrical drive shaft 336 is coupled for rotation with hub 378 by the tightening of nuts 377 about legs 369 and 371 whereby inclined surfaces 383 of seat 365 and inclined surfaces 385 of U-shaped coupler rod 367 frictionally engage shaft 336.

Figure 10:
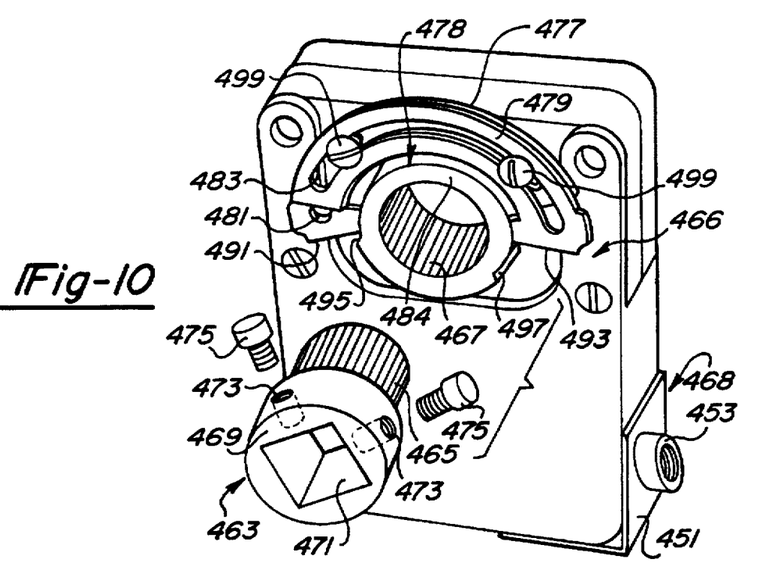
FIG. 10 is a partially exploded perspective view of the modular actuator having a removable coupler for rotating a driven shaft that is square in cross-section.

FIG. 10 illustrates an embodiment of the modular actuator apparatus 410 configured to rotatably actuate a driven shaft (not shown) that is square in cross-section. Output head 440 includes a removable output member 463 having an externally splined drum 465 cooperative with an internally splined aperture 467 formed in output hub 478. Output member 463 defines an outer annular face 469, a recess 471 extending axially inwardly therefrom, and radially extending threaded bores 473 communicating with recess 471 and cooperative with set screws 475. Those skilled in the art will appreciate that set screws 475 are removably engageable with threaded bores 473 to secure a drive shaft within recess 471. Recess 471 may define a variety of configurations including the square shape shown in FIG. 10 and may terminate within output member 463 or extend therethrough. Moreover, outer radial face 469 may also define a square or other shaped protrusion such as that shown in FIG. 11 and described hereinafter for engagement with a drive shaft having a recess therewithin.

FIG. 10 also discloses an alternate motion limiting apparatus 466 that may be used in lieu of motion limiting apparatus 266 shown in FIG. 8. Specifically, output shaft 484 defines first and second radial surfaces 495 and 497 engageable with first and second stop surfaces 491 and 493 defined by first and second stop members 477 and 479, respectively. Stop members 477 and 479 each include an arcuate body portion defining arcuate slots 481 and 483, respectively. When motion limiting apparatus 466 is assembled, first and second stop members 477 and 479, respectively, are disposed relative to one another such that arcuate slots 481 and 483 thereof are in alignment so as to accommodate adjusting screws 499 and first and second stop surfaces 491 and 493 are remote from one another. By this arrangement, the maximum angular displacement of output hub 478 is adjustable by loosening adjusting screws 499 and moving first and second stop members 477 and 479, respectively. Specifically, the allowed angular rotation of output hub 478 in a counterclockwise direction is increased and decreased, respectively, by displacing first stop member 477 in a clockwise and counterclockwise direction, respectively. In a similar fashion, the allowed angular displacement of output hub 478 in a clockwise direction is increased and decreased, respectively, by moving second stop member 479 in a counterclockwise and clockwise direction, respectively.

Finally, FIG. 10 also illustrates that a conduit connector 468 is attachable to base 138 such as by a screw (not shown). Conduit connector 468 includes a L-shaped body 451 and an internally threaded cylindrical projection 453 whereby a partially threaded wiring conduit (not shown) is removably connectable to base 138.

Figure 11:
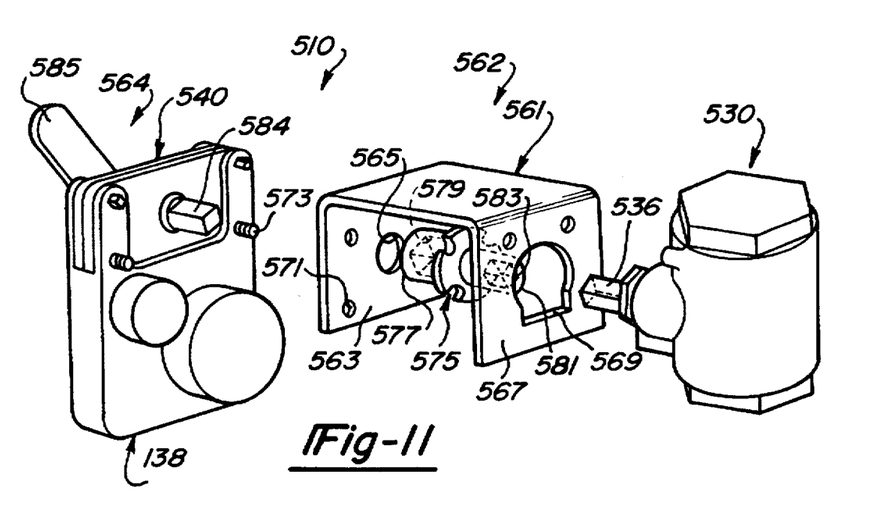
FIG. 11 is a partially exploded perspective view of the modular actuator configured to rotate a rotary valve.

FIG. 11 illustrates a modular actuating apparatus 510 configured to rotationally drive a positioning member 536 of a rotary valve 530. Actuator output head 540 is connected to base 138 and is similar in configuration to previously described output head 140. An attachment assembly 562 including a U-shaped bracket 561 defining a first leg 563 having a first aperture 565 adapted to accommodate the output shaft 584 of modular actuator 510 and a second leg 567 having a second aperture 569 adapted to accommodate positioning member 536 of rotary valve 530. It will be appreciated by those skilled in the art that a variety of methods may be used for attaching U-shaped bracket 561 to modular actuator apparatus 510 and rotary valve 530. As illustrated in FIG. 11, first leg 563 may be provided with apertures 571 cooperative with threaded bolts 573 connected to base 138 of mounting apparatus 510. Moreover, first and/or second apertures 565 and 569, respectively, are sized such that first and second legs 563 and 567, respectively, contact non-moving components of modular actuator apparatus 510 and rotary valve 530, respectively.

A coupler 575 rotatably couples actuator output shaft 584 to positioning member 536 of rotary valve 530. In the preferred embodiment, coupler 575 includes a first end 577 defining a recess 579 sized to cooperate with output shaft 584 and a second end 581 defining a recess 583 cooperative with positioning member 536. Those skilled in the art will appreciate that coupler 575 preferably accommodates radial misalignment between the actuator shaft 584 and the valve positioning member 536.

A manual override assembly 564 including a handle 585 is connected in a manner known in the art for rotation with second end (not shown) of shaft 584 thereby allowing manual rotation of shaft 584. Manual override assembly 564 may be provided in addition to the thumb wheel manual override assembly previously described.

Figure 12:
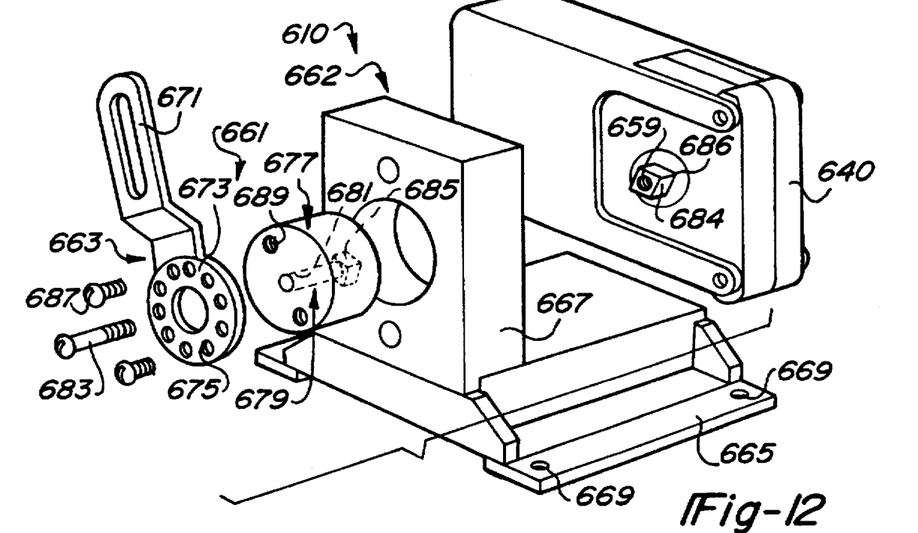
FIG. 12 is a partially exploded perspective view of the modular actuator configured to rotate an actuating arm.

In FIG. 12, modular actuator apparatus 610 is specifically configured for use with a "minimod" actuator (not shown) manufactured by Honeywell of Minneapolis, Minn. Specifically, apparatus 610 includes an output head 640 including an output shaft 684 having a threaded bore 659 extending axially inwardly from first shaft end 686. Modular actuator apparatus 610 further includes a crank assembly 661 connectable to the positioning member of the Honeywell device as well as an attachment assembly 662 having a base member 665 supporting an upstanding hub 667. Base member 665 is provided with apertures 669 for connecting attachment assembly 662 to the Honeywell actuator.

Crank assembly 661 includes a crank member 663 and a mounting cylinder 677. Crank member 663 includes a crank arm 671 connected to a connecting ring 673 having a plurality of apertures 675 formed therein for selectively securing crank assembly 661 in a variety of positions relative to mounting cylinder 677. Mounting cylinder 677 in turn defines a bore 679 that extends axially therethrough and that includes a first cylindrical portion 681 for accommodating a threaded screw 683 to threadably engage threaded bore 659 and secure mounting cylinder 677 to output shaft 684. Through-extending bore 679 is also shown to include a square-shaped portion 685 cooperative with shaft 684 to transfer rotational motion from shaft 684 to mounting cylinder 677. Crank arm 671 is connected to mounting cylinder 677 through threaded mounting bolts 687 that cooperate with apertures 675 on ring 673 and threadably engage internally threaded apertures 689 formed in mounting cylinder 677.

FIG. 13 illustrates an embodiment of the modular actuator apparatus 710 configured to linearly actuate a driven device such as linearly actuated valve 730 having a reciprocating positioning member 736. Specifically, apparatus 710 includes a rack 761 having a toothed face 763 in meshed engagement with pinion gear 148 of output gear cluster 142. Rack 761 also includes a smooth face 765 in sliding engagement with bracket 767 connected through a dowel 769 to actuator base 138. It will be appreciated by those skilled in the art that rotation of output gear cluster 142 provides linear movement of rack 761.

Rack 761 further includes a connecting rod 771 connectable to a nut 773 via a clip arrangement known in the art and generally indicated at 775. Nut 773 includes an output end 777 defining a threaded bore (not shown) extending axially inwardly therefrom. Valve positioning member 736 is threaded for engagement with the threaded bore of nut 773. As a result, linear movement of nut 773 via rack 761 is transferred to positioning member 736. An attachment apparatus 762, shown in FIGS. 13 and 14 as a mounting yolk having a threaded aperture 779 (FIG. 14), is connected to linear actuator base 138 via mounting bolts 781 and nuts 783. It will be appreciated that threaded aperture 779 engages a cooperatively threaded, non-moving component of valve 730 whereby linear actuator 710 is mounted to linearly actuated valve 730.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

What is claimed is:

1. An apparatus for effecting actuation of a positioning member of one of a rotatably driven device and a linearly driven device, said apparatus including a frame, an output gear cluster coupled to said frame for rotation relative thereto, and driving means for selectively rotating the output gear cluster in a first direction and a second direction, said apparatus comprising:

an output head including at least one of
  (a) a rotary output head adapted to couple the output gear cluster to the positioning member of the rotatably driven device, and
  (b) a linear output head adapted to couple the output gear cluster to the positioning member of the linearly driven device whereby selecting and coupling one of said rotary output head and linear output head to the output gear cluster and to the positioning member of one of the rotatably driven device and the linearly driven device provides an apparatus that selectively actuates one of the rotatably driven device and the linearly driven device.

2. The apparatus of claim 1 wherein said linear output head includes a rack and coupling means for connecting said rack to the positioning member of the linearly driven device, said rack configured for engaging interaction with said output gear cluster.

3. The apparatus of claim 2 further including attachment means connected to the frame for mounting the apparatus to the linearly driven device.

4. The apparatus of claim 3 wherein said attachment means includes a mounting yolk connected to said frame, said mounting yolk having fastening means for removably connecting said mounting yolk to the linearly driven device.

5. The apparatus of claim 1, wherein said rotary output head includes a geared hub and a support, said support connectable to the frame, said geared hub coupled to said support for rotation relative thereto, and wherein said geared hub is configured for engaging interaction with the output gear cluster.

6. The apparatus of claim 5, wherein said rotary output head further includes one of
  (a) a U-shaped coupler connected to said geared hub, said geared hub defining an aperture for accommodating a cylindrical drive shaft that is engageable with the positioning member, said U-shaped coupler defining an opening and having means for adjusting the size of said opening whereby said U-shaped coupler is adapted to frictionally connect the cylindrical drive shaft to said geared hub,
  (b) at least one set screw, said rotary output head defining at least one bore, and an aperture, said aperture accommodating a cylindrical drive shaft engageable with the positioning member, said at least one set screw engageable with said at least one bore and with said cylindrical drive shaft to couple said cylindrical drive shaft to said geared hub,
  (c) a shaft member integral with said geared hub and defining a recess engageable with the positioning member,
  (d) a movable coupler having external splines, said movable coupler defining a recess engageable with the positioning member, said geared hub defining an internally splined aperture cooperative with said external splines to removably couple said movable coupler to said geared hub, and
  (e) a shaft integral with said geared hub and engageable with the positioning member whereby selecting and coupling one of said rotary output heads to said output gear cluster and to the positioning member of the rotatably driven device provides an apparatus that selectively actuates one of a rotary valve and a rotary damper.

7. The apparatus of claim 6 further including attachment means connectable to the frame for mounting the apparatus to the rotatably driven device.

8. The apparatus of claim 7 wherein said attachment means includes a base member and a hub extending from said base member, said base member defining a plurality of apertures cooperative with first connecting means for connecting said base member to the rotatably driven device, said hub defining an aperture cooperative with second connecting means for connecting said hub to one of said frame and the support.

9. The apparatus of claim 7 wherein said attachment means includes a U-shaped bracket connectable to the frame and to said rotatably driven device, said U-shaped bracket defining a first leg and a second leg, said first leg connectable to one of said frame and the support, said second leg connectable to said rotatably driven device.

10. The apparatus of claim 6 further including stop means for limiting the angular movement of said geared hub.

11. The apparatus of claim 1 further including a conduit connection member connectable to the frame, said conduit connection member defining a threaded aperture threadably engageable with an electrical conduit.

12. The apparatus of claim 1 further including manual override means for providing manual rotation of said output gear cluster.

13. A modular actuating apparatus adapted to selectively actuate a positioning member of one of a rotatably driven device and a linearly driven device, said modular actuating apparatus comprising:

a base;

drive means connected to said base for providing a driving force to a drive shaft;

an output gear cluster connected to said base for rotation relative thereto;

a gear train mechanically coupling said drive shaft to said output gear cluster; and an output head including at least one of
  (a) a rotary output head for coupling said output gear cluster to the positioning member of the rotatably driven device, and
  (b) a linear output head for coupling said output gear cluster to the positioning member of the linearly driven device whereby selecting and coupling one of said rotary output head and linear output head to said output gear cluster and to the positioning member of one of the rotatably driven device and the linearly driven device provides an actuating apparatus that selectively actuates one of the rotatably driven device and the linearly driven device.

14. The modular actuating apparatus of claim 13, wherein said output gear cluster includes an input gear, a rotary drive gear, and a pinion gear.

15. The apparatus of claim 14 wherein said linear output head includes a rack and coupling means for connecting said rack to the positioning member of the linearly driven device, said rack configured for engaging interaction with said pinion gear.

16. The apparatus of claim 15 further including attachment means connected to said base for mounting the apparatus to the linearly driven device.

17. The apparatus of claim 14 wherein said rotary output head includes a geared hub and a support frame, said support frame coupled to said base, said geared hub coupled to said support frame for rotation relative thereto, said geared hub configured for engaging interaction with said rotary drive gear, said rotary output head further including one of (a) a U-shaped coupler connected to said geared hub, said geared hub including an aperture for accommodating a cylindrical drive shaft that is engageable with the positioning member, said U-shaped coupler defining an opening and having means for adjusting the size of said opening whereby said U-shaped coupler is adapted to frictionally connect the cylindrical drive shaft to said geared hub, (b) at least one set screw, said rotary output head defining at least one bore and an aperture, said aperture accommodating a cylindrical drive shaft engageable with the positioning member, said at least one set screw engageable with said at least one bore and with the cylindrical drive shaft to couple the cylindrical drive shaft to said rotary output head, (c) a shaft member integral with said geared hub and defining a recess engageable with the positioning member, (d) a movable coupler having external splines, said movable coupler defining a recess engageable with the positioning member, said geared hub defining an internally splined aperture cooperative with said external splines to removably couple said movable coupler to said geared hub, and (e) a shaft integral with said geared hub and engageable with the positioning member whereby selecting and coupling one of said rotary output heads to said rotary drive gear and to the positioning member of the rotatably driven device provides an apparatus that selectively actuates both a rotary valve and a rotary damper.

18. The apparatus of claim 17 further including attachment means for connecting the modular actuating apparatus to the rotatably driven device.

19. The apparatus of claim 18 wherein said attachment means includes a slab and a hub extending from said slab, said slab defining an aperture cooperative with first connecting means for connecting said slab to the rotatably driven device, said hub defining an aperture cooperative with second connecting means for connecting said hub to one of said base and said support frame.

20. The apparatus of claim 18 wherein said attachment means includes a U-shaped bracket connectable to said base and to the rotatably driven device, said U-shaped bracket defining a first leg and a second leg, said first leg connectable to one of said base and said support frame, said second leg connectable to said rotatably driven device.

* * * * *